United States Patent [19]

Endo et al.

[11] 4,436,398

[45] Mar. 13, 1984

[54] DEVICE FOR SPLITTING PART OF LIGHT INCIDENT ON AN IMAGE FORMING OPTICAL SYSTEM

[75] Inventors: Kiyonobu Endo; Noriyuki Nose, both of Yokohama, Japan

[73] Assignee: Canon Kabushiki Kaisha, Tokyo, Japan

[21] Appl. No.: 476,398

[22] Filed: Mar. 22, 1983

Related U.S. Application Data

[63] Continuation of Ser. No. 280,347, Jul. 6, 1981, abandoned.

[30] Foreign Application Priority Data

Jul. 25, 1980 [JP] Japan .................. 55-101909

[51] Int. Cl.³ .................. G03B 13/08; G02B 5/02
[52] U.S. Cl. .................. 354/476; 354/224; 350/162.23; 350/173; 250/237 G

[58] Field of Search ............ 354/23 R, 42, 49, 54–56, 354/59, 155, 166, 199–201, 219, 224, 225; 350/162.23, 172, 173; 250/237 R, 237 G

[56] References Cited

U.S. PATENT DOCUMENTS

3,464,337 9/1969 Trankner .................. 354/56

*Primary Examiner*—William B. Perkey
*Attorney, Agent, or Firm*—Fitzpatrick, Cella, Harper & Scinto

[57] ABSTRACT

A device for splitting an incident light on an image forming optical system by a relief type diffraction grating. The device is constructed of a transparent substrate and a transparent filling layer having substantially the same refractive index as that of the transparent substrate, and the relief type diffraction grating is formed on the interface between the substrate and the filling layer. With such an arrangement, the reflectively diffracted light is detected by the photodetector without any undue influence in the image-formation based on the transmissively diffracted light.

5 Claims, 11 Drawing Figures

DEVICE FOR SPLITTING PART OF LIGHT INCIDENT ON AN IMAGE FORMING OPTICAL SYSTEM

This application is a continuation of application Ser. No. 280,347 filed July 6, 1981 now abandoned.

BACKGROUND OF THE INVENTION

1. Field of the Invention

This invention relates to a device for splitting light by use of a diffraction grating. More particularly, this invention is concerned with a device which is adaptable to light metering devices in photographic cameras.

2. Description of the Prior Art

In light metering devices generally used in photographic cameras, an image forming light beam which has passed through an object lens is split by means of a beam splitter to form a portion of light beam which is detected by a photodetector. In the beam splitter useful for such light metering devices, there has not been used a single half mirror which is arranged in an oblique position within the camera. A beam splitting device used in photographic cameras and the like should desirably be as thin as possible.

U.S. Pat. No. 3,464,337 discloses a device for splitting the incident light in a geometrical-optics manner for light metering, in which two pieces of members, each being provided with a plurality of slant reflective surfaces, are cemented to each other to form a prismatic line raster.

The present invention is to provide a beam splitting device which is much more reduced in thickness by using a diffraction grating.

In a beam splitter for obtaining a portion of light to be detected by use of a diffraction, it is desirable to emit a light beam for imaging and a predetermined degree of diffracted light to be metered from a diffraction grating while preventing any unnecessary diffracted light from producing therein. The unnecessary diffracted light results in a flare or ghost which becomes harmful for the image formation.

Japanese Laid-Open Patent Application No. 42042/1978, which has been filed by the applicant, discloses a beam splitting device intended to fulfill the above desire. This beam splitting device utilizes a relief type diffraction grating which can be mass produced effeciently.

As described in the above Japanese Patent Disclosure, the relief type diffraction grating is of a construction having a surface where rigids are periodically found. Such diffraction grating can be mass produced inexpensively from any stable material known in the art, for example, plastics, by the use of any suitable copying technique such as compression molding.

In the beam splitter utilizing the diffraction grating, a transmissively diffracted light of zero degree is used as an image forming light beam without any modification and also the other transmissively or reflectively diffracted light(s) of No-th or (No±1)-th degrees is (are) conducted in a detector. The beam splitter disclosed in said Japanese Laid-Open Patent Application No. 42042/1978 uses first degree of diffracted light as a portion of light to be metered in addition to zero degree of diffracted light including the image information. As described in the above Japanese Patent Disclosure, this is due to the fact that in the presently known diffraction gratings, it is difficult to increase only two diffracted lights having no adjacent diffractive degree, that is, the zero degree of diffracted light and the second or higher degree of diffracted light in diffraction efficiency.

In general, where it is to split any light in a direction of diffractive angle $\theta$ by use of a diffraction grating having a pitch d, a relationship between the pitch d and the N-th degree of diffractive angle $\theta$ can be represented by the following formula:

$$d \sin \theta = N\lambda \tag{1}$$

where $\lambda$ is a wavelength of the incident light.

As can easily be seen from the above formula, the lower the degree N of the diffracted light to be metered is, the smaller the diffractive angle $\theta$ and, the pitch d become. In order to take the diffracted light to be metered out of the image forming light beam, the diffractive angle $\theta$ must be above a predetermined angle, for example, in the order of 30 degrees. Where zero degree of transmissively diffracted light and first (N=1) degree of transmissively or reflectively diffracted light are used, respectively, as an image forming light and a diffracted light to be metered, as in the beam splitter disclosed in said Japanese Patent Disclosure No. 42042/1978, the pitch d in a diffraction grating becomes equal to 1.1 $\mu$m from the above formula (1) if a diffracted light to be metered having its wavelength $\lambda$ of 0.55 $\mu$m is to be split with a diffractive angle $\theta$ of 30 degrees. This pitch is very fine so that the diffraction grating must be manufactured with high-level technique resulting in an increased cost of mass production.

A beam splitter overcoming the above problem has been proposed by the applicant as disclosed in Japanese Patent Application No. 10190/1979 corresponding to U.S. patent application Ser. No. 285,921, filed July 23, 1981, now abandoned, which is a continuation of U.S. patent application Ser. No. 114,201, now abandoned. This beam splitter is characterized by a higher degree of reflectively diffracted light utilized for light metering instead of the first degree of transmissively or reflectively diffracted light.

In the prior art relief type diffraction grating before said Japanese Patent Application No. 10190/1979, a lower degree of transmissively diffracted light is simultaneously produced resulting in a harmful ghost formed in the light beam from a view finder as hereinafter described with reference to FIG. 2. In the improved beam splitter disclosed in said Japanese Patent Application, lower degrees of transmissively diffracted light, except the zero degree of transmissively diffracted light, can be avoided by providing a transparent substrate forming a relief type diffraction grating with a ridged surface which is covered by a transparent binder having substantially the same refractive index as that of the transparent substrate.

This technique enables the beam splitter to include its grating portion having an increased pitch of several tens of $\mu$m or theoretically larger so that a master used to make the beam splitters can more inexpensively and easily be manufactured. The pitch in the grating portion of the beam splitter has generally been required to be in the order of 1 $\mu$m or less.

In reality, however, the binder must be severely selected taking account of various conditions such as optical characteristics including refractive index, transmission factor and others, adhesivity, handling properties and the like. It is not easy to select an appropriate binder from some kinds of binders which can actually be used in this technique for avoiding any harmful light.

SUMMARY OF THE INVENTION

It is an object of this invention to provide a device for splitting part of the incident light which has a structure reduced substantially in thickness.

Another object is to provide a beam splitting device having a compact structure which is suitable for use in light metering devices of single-lens reflex cameras.

Still another object is to provide a beam splitting device including a relief type diffraction grating which can easily be manufactured with relatively large pitch and which can take part of the incident light out of the optical path thereof.

DETAILED DESCRIPTION OF PREFERRED EMBODIMENTS

First of all, reference is briefly made to a beam splitting device disclosed in said Japanese Patent Application No. 10190/1979 which corresponds to U.S. patent application Ser. No. 285,921, filed July 23, 1981, which is a continuation of U.S. patent application Ser. No. 114,201, now abandoned.

Figure 1:
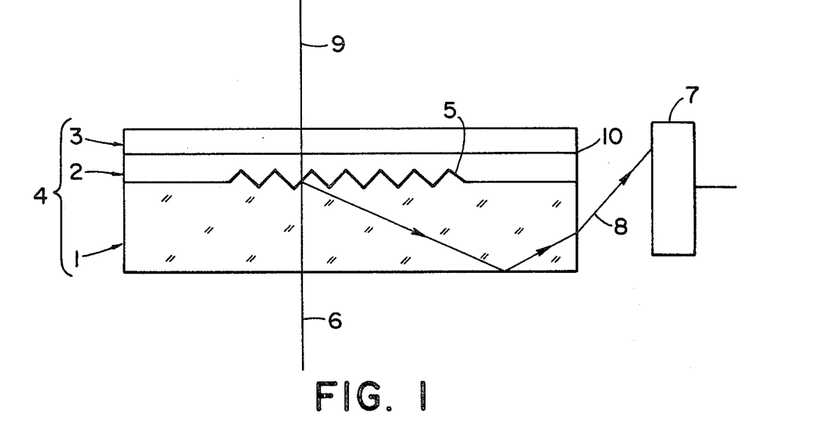
FIG. 1 is a cross-sectional view of a beam splitting device.

In FIG. 1, reference numeral 1 designates an optically transparent substrate having a surface on which a relief type diffraction grating is formed. The transparent substrate is made of a transparent material having a refractive index $N_1$, such as acrylic resin, polystyrene, polycarbonate and the like. Reference numeral 2 denotes a binder which is applied to the surface of the transparent substrate 1 with a thickness sufficient to cover the relief portion. The binder 2 is made of such a material that is selected from a group consisting of epoxy adhesive, acrylic adhesive, rubber adhesive, acrylic monomer, acrylic oligomer and the like. The binder 2 has a refractive index $N_2$ substantially equal to that of the optically transparent substrate 1.

Reference numeral 3 designates an optically transparent layer having a refractive index $N_3$ which is connected integrally with the optically transparent substrate 1 through the binder 2 to form a beam splitting device 4. If the surface of the binder 2 has sufficient flatness satisfied in optics, the optically transparent layer 3 cannot necessarily be formed.

Furthermore, a film consisting of a dielectric film of silicon oxide or titanium oxide or a metal film of aluminum, silver, etc. is deposited on the surface of the relief type diffraction grating to form a reflective film 5 having a certain reflection factor.

If a beam of light from an object is incident upon such a beam splitting device 4, the incident light beam 6 is split into two beam portions, a beam portion reflectively diffracted under a diffraction in the reflective film 5 on the surface of the relief type diffraction grating and another beam portion diffracted transmissively through the beam splitting device. A portion of the reflectively diffracted light beam 8 is transmitted through the beam splitting device 4 under the total reflection and then emitted from its emitting end face 10. The emitted light is metered by a photodetector 7. The remaining portion of the reflectively diffracted light passes through the beam splitting device 4 as zero degree of transmitted light 9.

The reflectively diffracted light so taken as a split beam portion has such a diffractive efficiency $\eta_R$ that can approximately be represented by the following formula:

$$\eta_R(N) = R \cdot \text{Sinc}^2(N\pi - \beta) \tag{1}$$

where N is 0, ±1, ±2, ... $\beta$ is $2\pi N_1 h/\lambda$, R is a reflection factor in the diffraction grating surface, h is the ridge height (peak-to-valley) in the grating portion, $N_1$ is a refractive index of the binder 2, and $\lambda$ is a wavelength of the light.

Furthermore, a diffraction angle $\theta$ of the diffracted light can be represented by the following formula:

$$\theta = \text{Sin}^{-1}\frac{N\lambda}{d}. \tag{2}$$

This diffraction angle $\theta$ is measured in the reference direction that the incident light is mirror-reflected by the grating surface. As viewed in FIG. 1, the reference direction is parallel to the surface of the transparent substrate 1. Therefore, the diffraction angle of a light beam vertically incident upon the grating surface as shown in FIG. 1 will be the same either in transmission or reflection under the same degree of diffraction.

Figure 2:
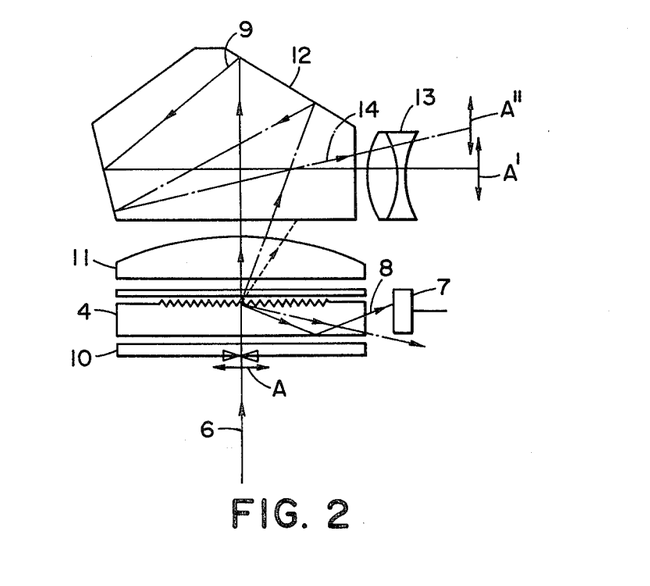
FIG. 2 is a schematic view illustrating a diffracted beam of light which is passed through the prior art beam splitting device used in a single-lens reflex camera.

FIG. 2 shows an example of a light metering device in a camera, to which the beam splitting device shown in FIG. 1 is applied.

In FIG. 2, the device comprises a focusing screen 10 normally having its lower surface that is a mat face, that is, a focus face and its upper surface that is constituted of a Fresnel lens. The device further comprises a beam splitting device 4, a condenser lens 11, a photodetector 7 of SPC or the like, a pentagonal prism 12, and an eyepiece lens 13. In such an arrangement, supposing that an image A is formed on the focusing screen 10 through a photographing lens (not shown), the image A is again imaged by means of the Fresnel lens, the condenser lens 11 and the eyepiece lens 13 to form a visible image A'. As the incident light beam 6 passes through the beam splitting device 4, one image A' is formed if there is only the zero degree of transmitted light 9. Actually, the refractive index difference $\Delta n$ between the transparent substrate 1 and the binder 2 is not zero, so that many transmissively diffracted light beams will be produced therein. If a transmissively diffracted light beam 14 among these light beams is incident upon the eyepiece lens 13, two images A', A" would be formed visibly. Thus, a plurality of images will be formed corresponding to the number of diffracted light beams through the eyepiece lens 13 to form a faded image as a whole.

With respect to the reflectively diffracted light, there are produced diffracted light beams other than the diffracted light beam 8 which is metered by the photodetector 7. Accordingly, the diffracted light 8 to be metered is correspondingly reduced in intensity. This results is not only a decreased metering efficiency but also a flare or ghost in the finder system.

In order to avoid such unnecessary diffracted light beams, it is preferred that said refractive index difference $\Delta n$ is equal to zero with respect to the transmissively diffracted light. In this case, the transmitted light beams are not subjected to any phase variation so that no diffraction will be produced. Therefore, any harmful transmissively diffracted light beam of low degree will not be produced.

Also, with respect to the reflectively diffracted light, the diffraction efficiency $n_R$ can be represented by the following formula induced from the above second formula (2) if the desired light beam is a diffracted light beam of $N_0$-th degree and the shape of grating is determined to obtain $N_0 = 2N_1 h/\lambda$:

$$\eta_R(N_0) = R.$$

With the reflectively diffracted light beam of N-th degree other than $N_0$-th degree, the diffraction efficiency $\eta_R$ can be represented by the following formula:

$$\eta_R(N) = R \, \text{Sinc}^2[(N-N_0)\pi] = 0.$$

As a result, any diffracted light beam of different degree from the degree of the light beam to be metered will not be produced in reflection-diffraction so that an ideal condition can be obtained.

The above matters are also described in said Japanese Patent Application No. 10190/1979. However, it is actually difficult to obtain the above ideal condition for the aforementioned reason with respect to the selection of binder material.

As described hereinbefore, the transmissively diffracted light beams particularly influence the focusing to form a faded image. Therefore, this problem is serious in the light metering system.

The problem with respect to the faded image based on the diffracted light mostly belongs to a sensuous matter. In order to determine a limit to which a faded image can be sensed, tests have been made by use of many panellers. As a result, it has been found that when ordinary persons look at an ordinary scene (object), even a faded image is acceptable for them if each diffraction efficiency in the transmissively diffracted light beams is in the order of about 6% or less.

From the result, it has been found that the diffraction efficiency $\eta_T$ in the transmissively diffracted light beams of N-th degree other than zero degree must be $$\eta_T(N) \leq 0.06 \tag{3}$$

(wherein N is $\pm 1, \pm 2, \ldots$) in order to accomplish the object of this invention.

The diffraction efficiency $\eta_T$ of the transmissively diffracted light beam can be represented by the following formula:

$$\eta_T(N) = (1-R) \, \text{Sinc}^2\pi \left( N - \frac{\Delta n \cdot h}{\lambda} \right) \tag{4}$$

where $N = 0, \pm 1, \pm 2, \ldots$ and $\Delta n$ is the refractive index difference between the binder (refractive index $N_1$) and the transparent substrate 1 (refractive index $N_2$) which can be represented by $\Delta n = |N_1 - N_2|$.

Accordingly, it has been found that the condition required in the formula (3) can be satisfied by setting the product $\Delta n \cdot h$ of the refractive index difference $\Delta n$ times the ridge height h in the grating portion within a certain range.

Figure 3A:
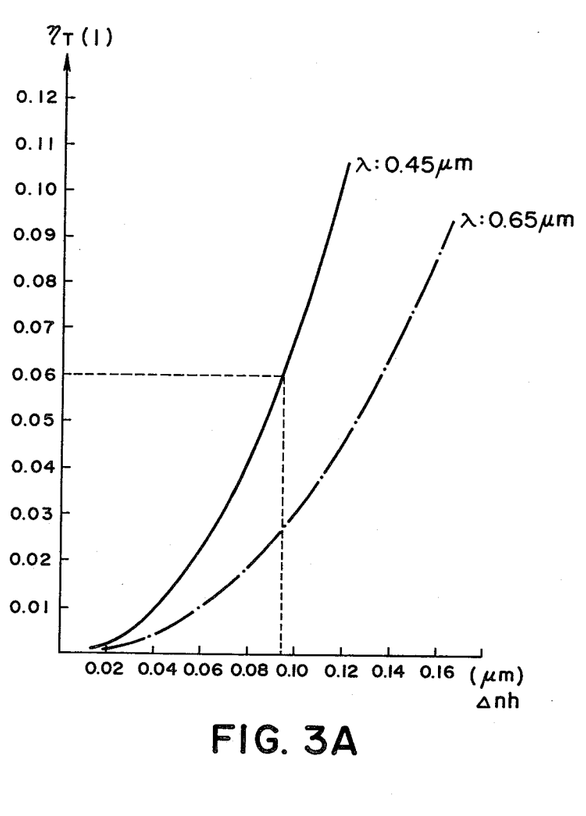
FIGS. 3A, 3B and 3C are graphs illustrating the relationships between the product of a grating ridge height h times a refractive index difference $\Delta n$ and the diffractive efficiency (1) of first degree of diffracted light, in a relief portion.

FIG. 3A shows a relationship between the product $\Delta n \cdot h$ and the diffraction efficiency $\eta_T(1)$ of the first degree of transmissively diffracted light beam under such a condition that the reflection factor in the reflective film is equal to zero, that is, no reflective film is placed on the relief structure. In FIG. 3A, the solid and dotted lines designate curves with respect to the different wavelength 0.45 $\mu$m and 0.65 $\mu$m of the incident light beams, respectively. Even if the reflection index of the reflective film is equal to zero, the reflection will be produced at the interface, that is, the grating surface unless the value $\Delta n$ is equal to zero.

It is understood from FIG. 3A that the product $\Delta n \cdot h$ of the refractive index difference $\Delta n$ times the ridge hiehgt h in the relief structure must be $$\Delta n \cdot h \leq \sim 0.095 \, (\mu m) \tag{5}$$

in order to limit the refraction efficiency of the first degree of transmissively diffracted light beam to about 6% or less throughout the whole wavelength range of visible light. It is also understood from the condition required in the formula (5) that the refractive index difference $\Delta n$ between the transparent binder material and the material forming the relief portion of the beam splitting device such as acrylic plastic, glass or the like must be maintained at about one hundred or less, if the beam splitting device has a relief structure with a ridge height of about 10 $\mu$m.

Figure 3B:
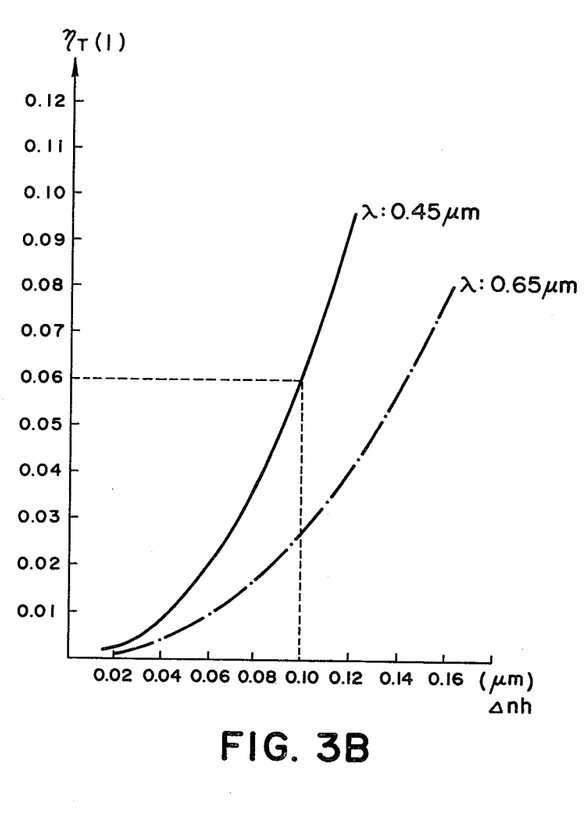

FIG. 3B shows a relationship between the values $\Delta n \cdot h$ and $\eta_T(1)$ when the reflective film on the relief structure has 10% of reflection factor. It is understood from this figure that there can be established the following relationship for obtaining about 6% of diffraction efficiency in the first degree of diffracted light beam:

$$\Delta n \cdot h \leq \sim 0.099 \, (\mu m) \tag{6}$$

It is therefore appreciated that a condition required with the value $\Delta n \cdot h$ can be even somewhat relaxed.

Figures 3C, 4A, 4B, 4C:
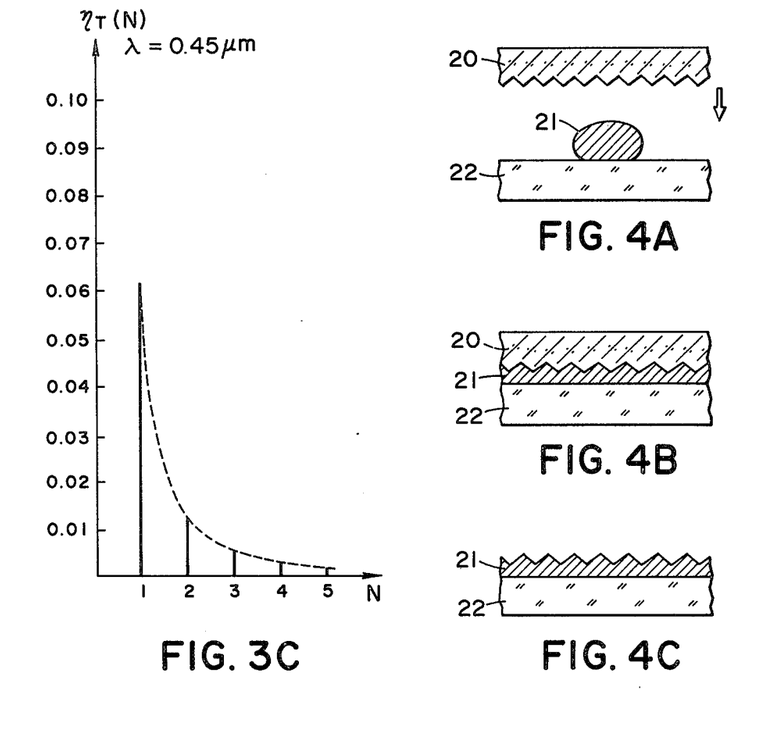
FIGS. 4A, 4B, 4C, 4D, 4E and 4F illustrate the respective steps of a process in which a beam splitting device is made.

Although only the diffraction efficiency in the first degree of transmissively diffracted light has been considered with respect to the relationships (5) and (6), FIG. 3C shows a comparison of transmission-diffraction efficiencies when the value N is equal to 1, 2, 3, 4 and 5, respectively. FIG. 3C is made under such a condition that the reflection factor is zero, the wavelength is 0.45 $\mu$m, and the value $\Delta n \cdot h$ is 0.095 or less. From this figure, it is understood that the transmission-diffraction efficiency in the first degree of transmissively diffracted light beam is higher than those of transmissively diffracted light beams having higher degrees. It can be thus said that the relationships (5) and (6) considered with respect to the first degree of transmissively diffracted light beam can also be satisfied in the diffraction efficiencies in the different degrees of transmissively diffracted beams.

If a beam splitting device is thus designed while considering the fact that the condition $N_0 = 2N_1 h/\lambda$ with respect to the reflection-diffraction must be substantially satisfied to increase, in intensity, only the $N_0$-th degree of reflectively diffracted light beam for metering ($N_0 \geq 2$), and that the transmission-diffraction efficiencies must be restrained up to 6% or less for avoiding adverse influences due to transmissively diffracted light beams having degrees lower than $N_0$-th degree, it is possible to obtain a light metering system providing an inappreciably faded image.

Upon preparing beam splitting devices, it is desirable that they are inexpensively mass-produced from a single master in any suitable manner such as compression molding and similar techniques. Accordingly, the relief portion of the beam splitting device is preferably made of such a material that can be compression molded, for example, acrylic plastic material.

As described hereinbefore, the refractive index difference between the binder material and the beam splitting device material must be equal to about 1/100 if the ridge height in the relief structure is 10 $\mu$m or less.

If the transparent substrate 1 is made of acrylic resin material, the binder may be made of high-molecular acrylic monomer material for satisfying said condition. According to this invention, therefore, it is possible to prepare even such a beam splitting device which could not been prepared in the prior art under a condition that the value $\Delta n$ is equal to zero.

Furthermore, it is possible to obtain the desired beam splitting device also by using such a process as will be described hereinafter.

In FIG. 4A, reference numeral 20 designates a master made of the conventional mold material and having a grating machined therein by means of a diamond machining tool, and reference numeral 21 denotes a mass of binder which can be solidified subjecting to any energy such as light, heat or the like and is optically transparent. Reference numeral 22 designates a transparent cover plate made of glass, plastics or the like. The binder material 21 is dropped on the cover plate 22 under a fluid state to form the mass as shown in FIG. 4A. The binder mass is then compressed by the master 20 as shown in FIG. 4B and thereafter subjected to any energy such as light, heat or the like to be set. If the binder material 21 consists of a thermosetting epoxy adhesive, it would be subjected to heat energy. The binder material 21 would be subjected to ultraviolet energy if it consists of an ultra-violet-setting adhesive.

Figure 4D:
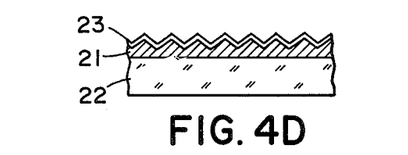
Figure 4E:
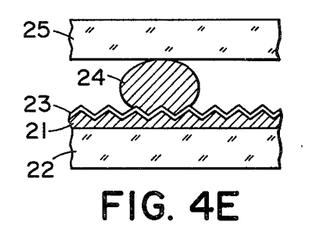
Figure 4F:
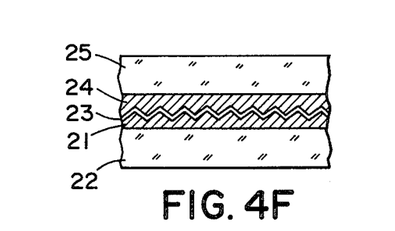

After the binder has been set, the master 20 is released to leave the binder such a state as shown in FIG. 4C. This release can easily be accomplished if any release agent is previously applied to the surface of the binder. The surface of the binder is then cleaned and covered at its desired area by a reflective film 23 having the desired reflection factor (see FIG. 4D). Thereafter, another mass 24 of the same binder material as the binder material 21 is dropped on the surface of the previously set binder material and then applied by another cover plate 25 (see FIG. 4E). Thereafter, the another mass 24 is compressed toward the previously set binder by the another cover plate 25 and then set similarly to form a laminated body as shown in FIG. 4F.

In this process, it appears that the value $\Delta n$ becomes equal to zero since the material forming the grating portion is the same as that of the binder. Actually, however, this is not necessarily be accomplished depending upon different setting conditions and different preparing histories. For example, the relief portion may be placed in vacuum when a reflective film is deposited on the surface thereof. However, a state that the value $\Delta n$ is approximately equal to zero can be realized according to this invention. Even in this case, any practical beam splitting device can be provided by establishing the ridge height within such a range that the relationship represented by the formula (5) can be satisfied.

The so prepared beam splitting device useful in light metering devices for cameras can be arranged within a camera at an optical path of imaging light beams to split such light beams for the desired purpose substantially without any adverse influence. Some examples of such arrangement are disclosed in said Japanese Patent Disclosure No. 42042/1978. Other arrangements may be similarly adopted in accordance with this invention.

As described hereinbefore, this invention can provide a beam splitting device having a relief type diffraction grating which has practical beam splitting characteristics even if the components thereof are not prepared under severe conditions with respect to various optics properties and which is particularly useful for light metering devices of cameras.

What we claim is:

1. A device for splitting part of the light incident on an image forming optical system, comprising:
   a transparent substrate having a surface on which a periodic relief is formed; and
   a transparent filling layer filling up completely said relief surface of said transparent substrate to form a relief type diffraction, grating therein,
   whereby said relief type diffraction grating serves to separate $N_0$-th order of reflected diffraction light ($N_0 \geq 2$) out of the optical path of said incident light, each of the transmitted diffraction light beams of orders low than the $N_0$-th order, except for zero order, having a diffraction efficiency not more than 6%.

2. A device for splitting part of the light incident on an image forming optical system, comprising:
   a transparent substrate having a refractive index $N_1$ and having a surface on which ridges, each having a peak-to-valley height h, are formed; and
   a transparent filling layer having a refractive index $N_2$ and filling up completely said ridged surface of said transparent substrate to form a relief type diffraction grating therein,
   whereby said peak-to-valley height h and the refractive index difference $\Delta n = |N_1 - N_2|$ between said transparent substrate and said transparent filling layer satisfy the following relationship:

$$\Delta n \cdot h \leq 0.095 \ \mu m$$

3. A device according to claim 1, wherein a reflective coating having a predetermined reflection power is applied to said surface of said transparent substrate.

4. (Amended) In a reflex camera having an image forming optical system and a device for detecting part of the light incident on said image forming optical system, said device comprising:
   a beam splitter comprising two transparent members on the interface of which a relief diffraction grating is formed, said beam splitter being disposed in the optical path for said incident light, the relief height h in said diffraction grating and the refractive index difference $\Delta n$ between said two transparent members being so selected that each of the transmitted diffraction light beams diffracted at said diffraction grating and having orders lower than the $N_0$-th order and higher than first order has a diffraction efficiency not more than 6%, where $N_0$ is a given integer equal to or more than two; and 5. A device according to claim 2, wherein a reflective coating having a predetermined reflection power is applied to said surface of said transparent substrate.

* * * * *

UNITED STATES PATENT AND TRADEMARK OFFICE
CERTIFICATE OF CORRECTION

PATENT NO. : 4,436,398

DATED : Mar. 13, 1984

INVENTOR(S) : Kiyonobu Endo et al

It is certified that error appears in the above-identified patent and that said Letters Patent is hereby corrected as shown below:

The specification and claims have been deleted to appear as per attached specification and claims as shown on the attached sheets.

Signed and Sealed this

Tenth Day of September 1985

[SEAL]

Attest:

DONALD J. QUIGG

Attesting Officer — Acting Commissioner of Patents and Trademarks - Designate

DEVICE FOR SPLITTING PART OF LIGHT INCIDENT ON AN IMAGE FORMING OPTICAL SYSTEM

BACKGROUND OF THE INVENTION

Field of the Invention

This invention relates to a device for splitting light by use of a diffraction grating. More particularly, this invention is concerned with such a device which is adaptable to light metering devices in photographic cameras.

Description of the Prior Art

In light metering devices generally used in photographic cameras, an image forming light beam which has passed through an object lens is split by means of a beam splitter to form a portion of light beam which is detected by a photodetector. In the beam splitter useful for such light metering devices, there has been used a large half mirror which is arranged in an oblique position within the camera. A beam splitting device used in photographic cameras and the like should desirably be as thin as possible.

The technique for realizing a thinner beam-splitter is known. For example, U.S. Patent No. 3,464,337 discloses a device for splitting the incident light in a geometrical-optics manner for light metering, in which two pieces of members, each being provided with a plurality of slant reflective surfaces, are cemented to each other to form a prismatic line raster. Since, however, this prismatic line raster is to geometrical-optically split the light beam, reduction in thickness of the beam splitter is limited.

The present invention is to provide a beam splitting device which is much more reduced in thickness by using a diffraction grating.

In a diffraction grating type beam splitter to be used in a single lens reflex camera, the transmitted light, i.e., the zero-order diffracted light is usually directed to an eyepiece as the imaging beam, while the diffracted light of a predetermined order is directed to a photodetector as the beam for metering. In such a beam splitter, generation of diffracted light of an order other than zero or the above-mentioned predetermined value is not desirable, since such unwanted-order diffracted light would cause flare or ghost which leads to degradation of image quality or metering accuracy.

Japanese Laid-Open Patent Application No. 42042/1978, which has been filed by the assignee of the subject application, discloses a beam splitting device intended to fulfill the above desire. This beam splitting device utilizes a relief type diffraction grating which can be mass produced with high efficiency.

As described in the above Japanese Patent Disclosure, the relief type diffraction grating has a surface where grooves are periodically formed. Such a diffraction grating can be mass produced inexpensively from any stable material known in the art, for example, plastics by use of any suitable copying technique such as compression molding.

In the beam splitter utilizing the diffraction grating, a transmitted diffraction light of zero order can be used as an image forming light beam and the other transmitted or reflected diffraction light(s) of No-th or (No±1)-th order is (are) directed to a detector. The beam splitter disclosed in said Japanese Laid-Open Patent Application No. 42042/1978 uses first order of diffracted light as a portion of light for metering and zero order of diffracted light carrying the image information for range-finding. As described in the above Japanese Patent Disclosure, this is due to the fact that in the presently known diffraction gratings, it is difficult to increase the diffraction efficiencies of two diffraction light beams having non-adjacent diffraction orders, e.g., the zero order of diffracted light and the second or higher order of diffracted light.

In general, where it is to split any light in a direction of diffraction angle $\theta$ by use of a diffraction grating having a pitch d, a relationship between the pitch d and the N-th order of diffraction angle $\theta$ can be represented by the following formula:

$$d \sin \theta = N\lambda \qquad (1)$$

where $\lambda$ is a wavelength of the incident light.

As can easily be seen from the above formula, the lower the order N of the diffracted light to be metered is, the smaller the diffraction angle $\theta$ and the pitch d become. In order to split or to take up the diffracted light, to be metered, out of the image forming light beam, the diffraction angle $\theta$ must be above a predetermined angle, for example, in the order of 30 degrees. Where zero order of transmitted diffraction light and first (N=1) order of transmitted or reflected diffraction light are used respectively as an image forming light and a diffracted light to be metered, as in the beam splitter disclosed in said Japanese Patent Disclosure No. 42042/1978, the pitch d of a diffraction grating becomes 1.1 $\mu$m from the above formula (1) if a diffracted light to be metered having its wavelength $\lambda$ of 0.55 $\mu$m is to be split with a diffraction angle $\theta$ of 30 degrees. This pitch is very fine so that the diffraction grating must be manufactured with high-level techniques resulting in an increased cost of mass production.

A beam splitter overcoming the above problem has been proposed, by the assignee of the subject application, in Japanese Patent Application No. 10190/1979 corresponding to U.S. Patent Application Ser. No. 114,201. This beam splitter is characterized by utilizing a higher order of reflected diffraction light for light metering instead of the first order of transmitted or reflected diffraction light.

In the prior art relief type diffraction grating before said Japanese Patent Application No. 10190/1979, lower order of transmitted diffraction light is simultaneously produced, resulting in a harmful ghost in the view finder as will be hereinafter described with reference to FIG. 2. In the improved beam splitter disclosed in said Japanese Patent Application, lower orders of transmitted diffraction lights except the zero order of transmitted diffraction light can be avoided by providing a transparent substrate having a relief type diffraction grating which is covered by a transparent material having substantially the same refractive index as that of the transparent substrate.

This technique enables the beam splitter to have a grating of an increased pitch of several tens of $\mu$m so that a master grating to be used to make the beam splitters can more inexpensively and easily be manufactured, as compared with conventional ones in which the pitch in the grating portion of the beam splitter has generally been required to be in the order of 1 $\mu$m or less.

In reality, however, the material must be severely selected taking account of various conditions such as optical characteristics including refractive index, optical transmittance and other manufacturing factors such as adhesivity, handling properties and the like. It is not easy to select an appropriate material from many kinds of materials which can actually be used in this technique for avoiding any harmful light.

SUMMARY OF THE INVENTION

It is an object of this invention to provide a device for splitting part of the incident light and having a structure reduced substantially in thickness.

Another object is to provide a beam splitting device having a compact structure which is suitable for use in light metering devices of single-lens reflex cameras.

Still another object is to provide a beam splitting device including a relief type diffraction grating which can easily be manufactured with relatively large pitch and which can take up a part of the incident light out of the optical path thereof.

BRIEF DESCRIPTION OF THE DRAWINGS

FIG. 1 is a cross-sectional view of a beam splitting device;

FIG. 2 is a schematic view illustrating a diffracted beam of light which is passed through the prior art beam splitting device used in a single-lens reflex camera;

FIGS. 3A, 3B and 3C are graphs illustrating the relationships of the product of a grating relief height h and a refractive index difference $\Delta n$ with the diffraction efficiency (1) of first order of diffracted light; and FIGS. 4A, 4B, 4C, 4D, 4E and 4F illustrate the respective steps of a process in which a beam splitting device is made.

DETAILED DESCRIPTION OF PREFERRED EMBODIMENTS

First of all, reference is briefly made to a beam splitting device disclosed in said Japanese Patent Application No. 10190/1979 which corresponds to U.S. Patent Application Ser. No. 114,201.

In FIG. 1, reference numeral 1 designates an optically transparent substrate having a surface on which a relief type diffraction grating is formed. The transparent substrate is made of a transparent material having a refractive index $N_1$, such as acrylic resin, polystyrene, polycarbonate and the like. Reference numeral 2 denotes a material which is applied to the surface of the transparent substrate 1 with a thickness sufficient to cover the relief portion. The material 2 is made of such a material that is selected from a group consisting of epoxy adhesive, acrylic adhesive, rubber adhesive, acrylic monomer, acrylic oligomer and the like. The material 2 has a refractive index $N_2$ substantially equal to that of the optically transparent substrate 1.

Reference numeral 3 designates an optically transparent member having a refractive index $N_3$ which is bound integrally with the optically transparent substrate 1 by the material 2 to form a beam splitting device 4. If the surface of the material 2 has flatness for the finder optics, the optically transparent member 3 may be deleted.

Furthermore, a film consisting of a dielectric film of silicon oxide or titanium oxide or a metal film of aluminum, silver, etc., is deposited on the surface of the relief type diffraction grating to form a reflective film 5 having a certain reflection factor.

If the light from an object is incident upon such a beam splitting device 4, the incident light beam 6 is split into two beam portions, a beam portion reflectively diffracted by the reflective film 5 on the surface of the relief type diffraction grating and another beam portion diffracted transmissively through the beam splitting device. A portion of the reflected diffraction light beam 8 is directed through the beam splitting device 4 under the total reflection and then emitted from its emitting end face 10. The emitted light is metered by a photodetector 7. The remaining portion of the incident light passes through the beam splitting device 4 as zero order of transmitted light 9.

The reflected diffraction light has such a diffraction efficiency $\eta_R$ that can approximately be represented by the following formula:

$$\eta_R(N) = R \cdot \text{Sinc}^2 (N\pi - \beta) \quad (1)$$

where N is 0, $\pm 1$, $\pm 2$, ... $\beta$ is $2\pi N_1 h/\lambda$, R is a reflection factor in the diffraction grating surface, h is the relief height (peak-to-valley) in the grating portion, $N_1$ is a refractive index of the substrate 1, and $\lambda$ is a wavelength of the light.

Furthermore, a diffraction angle $\theta$ of the diffracted light can be represented by the following formula:

$$\theta = \text{Sin}^{-1} \frac{N\lambda}{n} \quad (2)$$

This diffraction angle $\theta$ is measured in the reference direction that the incident light is mirror-reflected by the grating surface. As viewed in FIG. 1, the reference direction if perpendicular to the surface of the transparent substrate 1. Therefore, the diffraction angle of a light beam perpendicularly incident upon the grating surface as shown in FIG. 1 will be the same either in transmission or reflection under the same order of diffraction.

FIG. 2 shows an example of light metering device in a camera, to which the beam splitting device shown in FIG. 1 is applied.

In FIG. 2, the device comprises a focusing screen 10 which normally has at its lower surface a mat face, that is, a focus face and at its upper surface a Fresnel lens. The device further comprises a beam splitting device 4, a condenser lens 11, a photodetector 7 of SPC or the like, a pentagonal prism 12, and an eyepiece lens 13. In such an arrangement, supposing that an image A is formed on the focusing screen 10 through a photographing lens (not shown), the image A is again imaged by means of the Fresnel lens, the condenser lens 11 and the eyepiece lens 13 to form a visible image A'. As the incident light beam 6 passes through the beam splitting device 4, one image A' is formed if there is only the zero ordered transmitted light 9. Actually, the refractive index difference $\Delta n$ between the transparent substrate 1 and the binder 2 is not zero, so that many transmitted diffraction light beams will be produced therein. If a transmitted diffraction light beam 14 among these light beams is incident upon the eyepiece lens 13, two images A', A" would be observed. Thus, a plurality of images will be formed corresponding to the number of diffracted light beams through the eyepiece lens 13 to form a faded image as a whole.

With respect to the reflected diffraction light, there are produced diffracted light beams other than the diffracted light beam 8 which is metered by the photodetector 7. Accordingly, the diffracted light 8 to be metered is reduced in intensity. This results in not only a decreased metering efficiency but also a flare or ghost in the finder system.

In order to avoid such unnecessary diffracted light beams, it is preferred that said refractive index difference $\Delta n$ is zero with respect to the transmitted diffraction light. In this case, the transmitted light beams are not subjected to any phase difference so that no diffraction will be produced. Therefore, any harmful transmitted diffraction light beam of low order will not be produced.

Also, with respect to the reflected diffraction light, the diffraction efficiency $\eta_R$ can be represented by the following formula induced from the above second formula (2) if the desired light beam is a diffracted light beam of $N_0$-th order and the shape of grating is determined to obtain $N_0 = 2N_1 h/\lambda$:

$$\eta_R(N_0) = R$$

With the reflected diffraction light beam of N-th order other than $N_0$-th order, the diffraction efficiency $\eta_R$ can be represented by the following formula:

$$\eta_R(N) = R \, \text{Sinc}^2 \, [(N - N_0) \, \pi] = 0$$

As a result, any reflected diffraction light beam of different order from the order of the light beam to be metered will not be produced in reflected diffraction so that an ideal condition can be obtained.

The above matters are also described in said Japanese Patent Application No. 10190/1979. However, it is actually difficult to obtain the above ideal condition for the aforementioned reason with respect to the selection of material.

As described hereinbefore, the transmitted diffraction light beams particularly produce faded images and reduce focusing ability. Therefore, this problem is serious in the light metering system.

The problem with respect to the faded image based on the diffracted light mostly belongs to a sensuous matter. In order to determine a limit to which a faded image can be sensed, tests have been made by use of many groups of individuals. As a result, it has been found that when ordinary persons look at an ordinary scene (object), a faded image is not sensed for them if each diffraction efficiency in the transmitted diffraction light beams is in the order of about 6% or less.

From the result, it has been found that the diffraction efficiency $\eta_T$ in the transmitted diffraction light beams of N-th order other than zero order must be $$\eta_T(N) \leq 0.06 \quad (3)$$

(wherein N is $\pm 1$, $\pm 2$, .....) in order to accomplish the object of this invention.

The diffraction efficiency $\eta_T$ of the transmitted diffraction light beam can be represented by the following formula:

$$\eta_T(N) = (1 - R) \, \text{Sinc}^{\,2} \pi (N - \frac{\Delta n \cdot h}{\lambda}) \quad (4)$$

where $N = 0, \pm 1, \pm 2, \ldots$ and $\Delta n$ is the refractive index difference between the material 2 (refractive index $N_2$) and the transparent substrate 1 (refractive index $N_1$) which can be represented by $\Delta n = |N_1 - N_2|$.

Accordingly, it has been found that the condition required in the formula (3) can be satisfied by setting the product nh of the refractive index difference n and the relief height h in the grating portion within a certain range.

Fig. 3A shows a relationship between the product $\Delta n \cdot h$ and the diffraction efficiency $\eta_T(1)$ of the first order of transmitted diffraction light beam under such a condition that the reflection factor in the reflective film is zero, that is, no reflective film is provided on the relief structure. In Fig. 3A, the solid and dotted lines designate curves with respect to the different wavelength 0.45 μm and 0.65 μm of the incident light beams, respectively. Even if the reflection factor of the reflective film is zero, the reflection will be produced at the interface, that is, the grating surface unless the value $\Delta n$ is zero.

It is understood from FIG. 3A that the product $\Delta n \cdot h$ of the refractive index difference n and the relief height h in the relief structure must be $$\Delta n \cdot h \leq \sim 0.095 \, (\mu m) \quad (5)$$

in order to limit the diffraction efficiency of the first order of transmitted diffraction light beam to about 6% or less throughout the whole wavelength range of visible light. It is also understood from the condition required in the formula (5) that the refractive index difference $\Delta n$ between the transparent material and the material forming the relief portion of the beam splitting device such as acrylic plastic, glass or the like must be maintained at about 1/100 or less, if the beam splitting device has a relief structure with a relief height of about 10 μm.

FIG. 3B shows a relationship between the values $\Delta n \cdot h$ and $\eta_T(1)$ when the reflective film on the relief structure has 10% of reflection factor. It is understood from this figure that there can be established the following relationship for obtaining about 6% of diffraction efficiency in the first order of diffracted light beam:

$$\Delta n \cdot h \leq \sim 0.099 \, (\mu m) \quad (6)$$

It is therefore appreciated that a condition required with the value nh can be even somewhat relaxed.

Although only the diffraction efficiency in the first order of transmitted diffraction light has been considered with respect to the relationships (5) and (6), FIG. 3C shows a comparison of transmitted diffraction efficiencies when the value N is equal to 1, 2, 3, 4 and 5, respectively. FIG. 3C is made under such a condition that the reflection factor is zero, the wavelength is 0.45 μm, and the value $\Delta n \cdot h$ is 0.095 or less. From this figure, it is understood that the transmitted diffraction efficiency in the first order of transmitted diffraction light beam is higher than those of transmitted diffraction light beams having higher orders. It can be thus said that the relationships (5) and (6) considered with respect to the first order of transmitted diffraction light beam can also be satisfied in the diffraction efficiencies in the different orders of transmitted diffraction beams.

If a beam splitting device is thus designed while considering the fact that the condition $N_0 = 2N_1 h/\lambda$ with respect to the reflected diffraction must be substantially satisfied to produce only the $N_0$-th order of reflected diffraction light beam for metering ($N_0 \geq 2$), and that each of the transmitted diffraction efficiencies must be not more than 6% for avoiding adverse influences due to transmitted diffraction light beams having orders lower than $N_0$-th order, it is possible to obtain a light metering system providing an inappreciably faded image.

Upon preparing beam splitting devices, it is desirable that they are inexpensively mass-produced from a single master in any suitable manner as compression molding and similar techniques. Accordingly, the relief portion of the beam splitting device is preferably made of such a material that can be compression molded, for example, acrylic plastic material.

As described hereinbefore, the refractive index difference between the material and the beam splitting device material must be equal to about 1/100 if the relief height in the relief structure is 10μm or less.

If the transparent substrate 1 is made of acrylic resin material, the binder may be made of high-molecular acrylic monomer material for satisfying said condition. According to this invention, therefore, it is possible to prepare even such a beam splitting device which could not have been prepared in the prior art under a severe condition that the value Δn must be zero.

Furthermore, it is possible to obtain the desired beam splitting device also by using such a process as will be described hereinafter.

In FIG. 4A, reference numeral 20 designates a master made of the conventional master mold material and having a grating machined therein by means of a diamond machining tool, and reference numeral 21 denotes a mass of a material which can be solidified subjecting to any energy such as light, heat or the like and is optically transparent. Reference numeral 22 designates a transparent cover plate made of glass, plastics or the like. The material 21 is dropped on the cover plate 22 under a fluid state to form the mass as shown in FIG. 4A. The mass is then compressed by the master 20 as shown in FIG. 4B and thereafter subjected to any energy such as light, heat or like to be set. If the material 21 consists of a thermosetting epoxy adhesive, it would be subjected heat energy. The material 21 would be subjected to ultraviolet light if it consists of an ultra-violet-setting adhesive.

After the material has been set, the master 20 is released to leave the material in such a state as shown in FIG. 4C. This release can easily be accomplished if any release agent is previously applied to the surface of the material. The surface of the material is then cleaned and covered at its desired area by a reflective film 23 having the desired reflection factor (see FIG. 4D). Thereafter, another mass 24 of the same material as the material 21 is dropped on the surface of the previously set material and then applied by another cover plate 25 (see FIG. 4E). Thereafter, the another mass 24 is compressed toward the previously set material by the another cover plate 25 and then set similarly to form a laminated body as shown in FIG. 4F.

In this process, it appears that the value Δn becomes zero since the material forming the grating portion is the same as that of the binder. Actually, however, this is not necessarily accomplished depending upon different setting conditions and different preparing histories. For example, the relief portion may be placed in vacuum when a reflective film is deposited on the surface thereof. However, a state that the value Δn is approximately zero can be realized according to this invention. Even in this case, any practical beam splitting device can be provided by establishing the relief height within such a range that the relationship represented by the formula (5) can be satisfied.

The prepared beam splitting device useful in light metering devices for cameras can be arranged within a camera in an optical path of imaging light beams to split such light beams for the desired purpose substantially without any adverse influence. Some examples of such arrangement are disclosed in said Japanese Patent Disclosure No. 42042/1978. Other arrangements may be similarly adopted in accordance with this invention.

As described hereinbefore, this invention can provide a beam splitting device having a relief type diffraction grating which has practical beam splitting characteristics even if the components thereof are not prepared under severe conditions with respect to various optics properties and which is particularly useful for light metering devices of cameras.

What we claim is:

1. A device for splitting part of the light incident on an image forming optical system, comprising:
   a transparent substrate having a surface on which a periodic relief is formed; and
   a transparent filling layer filling up completely said relief surface of said transparent substrate to form a relief type diffraction grating therein,
   whereby said relief type diffraction grating serves to separate $N_0$-th order of reflected diffraction light ($N_0 \geq 2$) out of the optical path of said incident light, each of the transmitted diffraction light beams of orders lower than the $N_0$-th order, except for zero order, having a diffraction efficiency not more than 6%.

2. A device for splitting part of the light incident on an image forming optical system, comprising:
   a transparent substrate having a refractive index $N_1$ and having a surface on which a relief having a peak-to-valley height h, is formed; and
   a transparent filling layer having a refractive index $N_2$ and filling up completely said relief surface of said transparent substrate to form a relief type diffraction grating therein,
   whereby said peak-to-valley height h and the refractive index difference $\Delta n = |N_1 - N_2|$ between said transparent substrate and said transparent filling layer satisfy the following relationship:

$$\Delta n \cdot h \leq 0.095 \mu m$$

3. A device according to claim 1, wherein a reflective layer having a predetermined reflection factor is applied to said surface of said transparent substrate.

4. In a reflex camera having an image forming optical system and a device for detecting part of the light incident on said image forming optical system, said device comprising:
   a beam splitter comprising two transparent members on the interface of which a relief type diffraction grating is formed, said beam splitter being disposed in the optical path for said incident light, the relief height h in said diffraction grating and the refractive index difference $\Delta n$ between said two transparent members being so selected that each of the transmitted diffraction light beams diffracted at said diffraction grating and having orders lower than the $N_0$-th order and higher than first order has a diffraction efficiency not more than 6%, where $N_0$ is a given integer equal to or more than two; and
   a photodetector disposed outside of the optical path of said incident light for detecting the $N_0$-th order of reflected diffraction light beam which has been diffracted at said relief type diffraction grating.

* * * * *

UNITED STATES PATENT AND TRADEMARK OFFICE
CERTIFICATE OF CORRECTION

PATENT NO. : 4,436,398
DATED : March 13, 1984
INVENTOR(S) : Kiyonobu Endo, et al.

It is certified that error appears in the above-identified patent and that said Letters Patent is hereby corrected as shown below:

Col. 4, line 30, change "$\theta = \sin^{-1} \frac{N\lambda}{n}$" to --$\theta = \sin^{-1} \frac{N\lambda}{d}$--.

Col. 6, line 69, after "manner" insert --such--.

Col. 7, line 33, after "subjected" insert --to--;
line 56, after "in" insert --a--.

Col. 8, line 31, delete ",".

<u>IN THE CLAIMS</u>:

Please add claim 5.

--5. A device according to claim 2, wherein a reflective coating having a predetermined reflection power is applied to said surface of said transparent substrate.--

Signed and Sealed this

Fourteenth Day of January 1986

[SEAL]

Attest:

DONALD J. QUIGG

Attesting Officer    Commissioner of Patents and Trademarks